United States Patent [19]

Saylor et al.

[11] Patent Number: 4,769,154

[45] Date of Patent: Sep. 6, 1988

[54] CHLORINE OXIDATION WASTE WATER TREATMENT METHOD

[75] Inventors: William D. Saylor; Milton K. Foss, both of Port Townsend, Wash.; Robert A. Schmid, Fairview, Oreg.

[73] Assignee: Waste Water Management, Inc., Troutdale, Oreg.

[21] Appl. No.: 114,578

[22] Filed: Oct. 29, 1987

[51] Int. Cl.⁴ .......................... C02F 1/24; C02F 1/76
[52] U.S. Cl. ................... 210/707; 210/712; 210/745; 210/754; 210/758
[58] Field of Search ................ 210/704–707, 210/712, 713, 724, 725, 729–736, 743, 745, 754, 756, 758–760, 765

[56] References Cited

U.S. PATENT DOCUMENTS

| | | | |
|---|---|---|---|
| 3,300,402 | 1/1967 | Grich et al. | 210/631 X |
| 3,904,521 | 9/1975 | Stopka | 210/704 |
| 3,953,331 | 4/1976 | Bradley | 210/758 |
| 4,179,347 | 12/1979 | Krause et al. | 210/707 X |
| 4,211,651 | 7/1980 | Thomas | 210/706 X |
| 4,482,459 | 11/1984 | Shiver | 210/72 S X |
| 4,615,807 | 10/1986 | Haines et al. | 210/704 |

Primary Examiner—Tom Wyse
Attorney, Agent, or Firm—Cullen, Sloman, Cantor, Grauer, Scott and Rutherford

[57] ABSTRACT

A method for oxidation treatment of waste water material containing organic solid particles includes forming a discrete batch of waste water material, adjusting the pH of the entire batch to close to 7 or acid-alkaline neutral, and then flowing the batch through a reactor along with chlorine gas. The chlorine produces hypochlorous acid, which produces nascent oxygen and hypochlorite ions, for chemically oxidizing the organic solid particles and also forming minute gas bubbles, including nitrogen and carbon dioxide, which adhere to the particles. The treated material is flowed into a separation receptacle, where the gas bubble buoyed particles float to the surface of the water. The clear water is rapidly gravity-drained from beneath the particles, leaving the particles coalesced into a relatively dry, disinfected or stabilized sludge. The drained clear water may be substantially pH-neutralized and then flowed into a water system for reuse, while the stabilized, disinfected sludge may be deposited elsewhere as fertilizer or ground cover and the like.

18 Claims, 1 Drawing Sheet

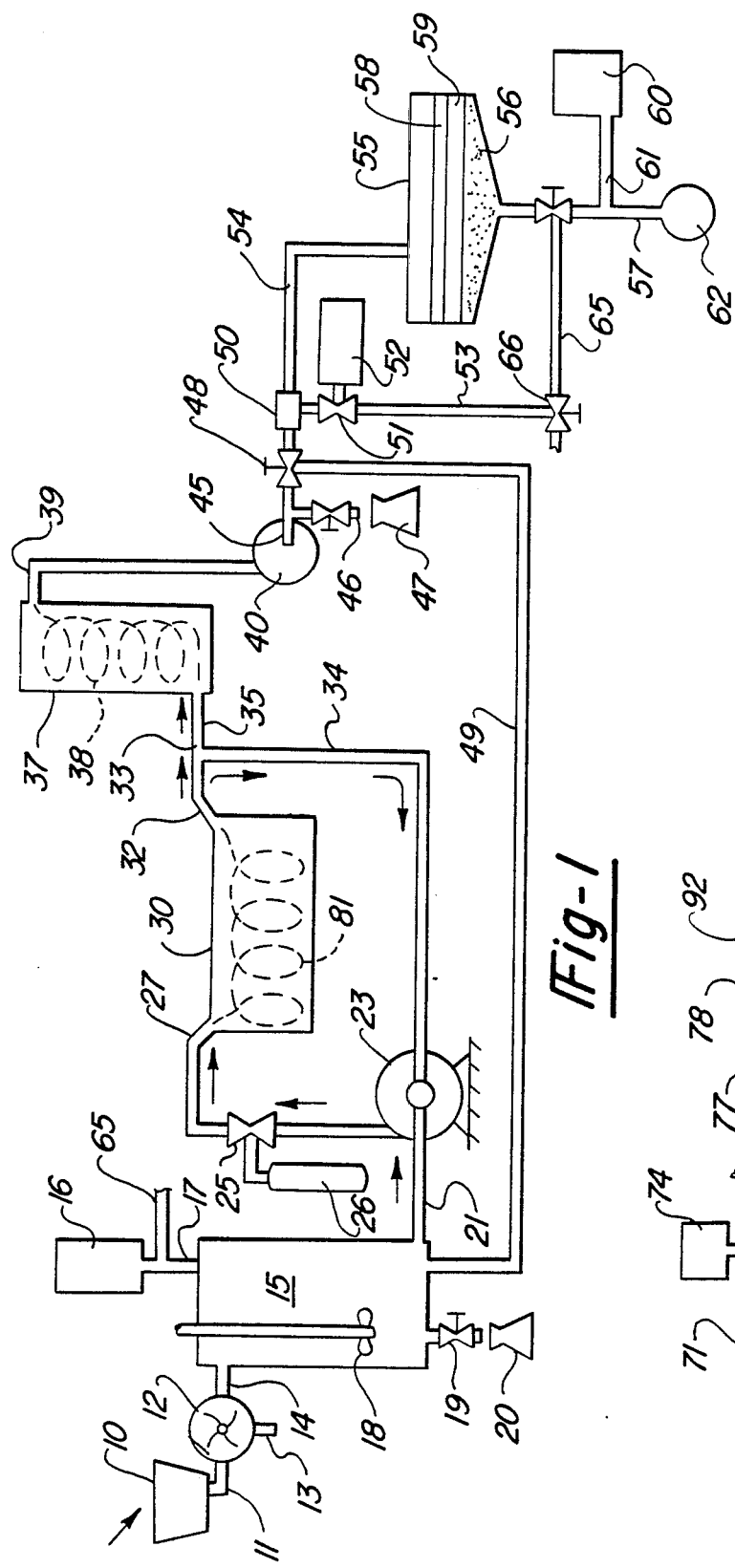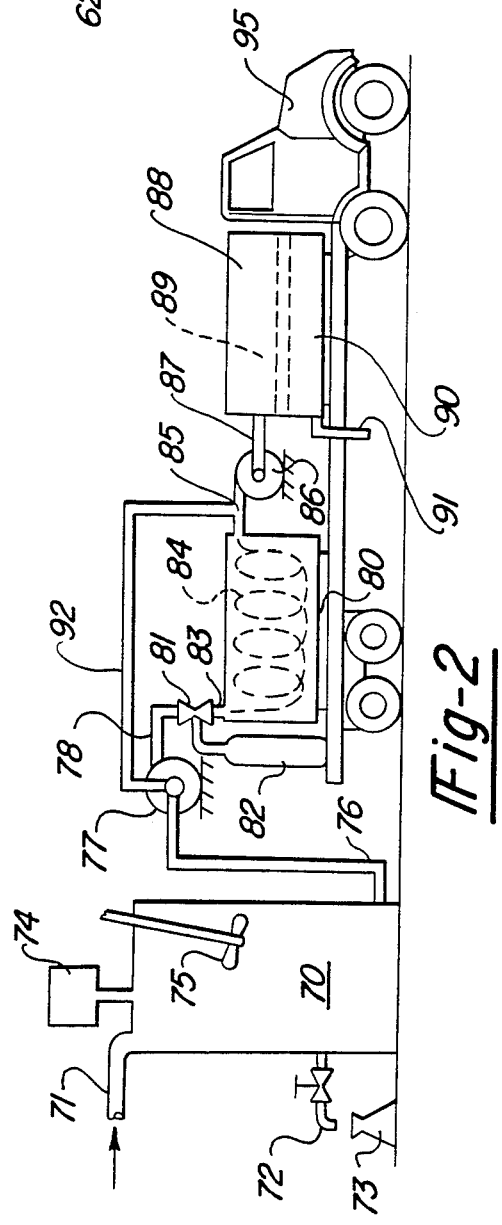

CHLORINE OXIDATION WASTE WATER TREATMENT METHOD

BACKGROUND OF INVENTION

This invention relates to an improved chemical oxidation method for treating waste water containing organic particles by which the particles are disinfected or stabilized and are separated from the water. More particularly, this invention relates to improvements in the chemical oxidation process and apparatus of the general types disclosed in U.S. Pat. No. 3,943,955 issued Mar. 16, 1976 to Bradley and U.S. Pat. No. 3,953,331 issued Apr. 27, 1976 to Bradley. The process disclosed in these two prior patents refer generally to, and are stated to be improvements upon, a chemical oxidation process disclosed in an earlier U.S. Pat. No. 3,300,402 issued Jan. 24, 1967 to Grich and Hood. The processes disclosed in these prior patents are directed towards the treatment of waste water, that is, waste material containing organic waste particles suspended in water, such as sewage, septage waste, sludges produced by municipal treatment plants, food preparation or food processing wastes, and the like. The objective is to disinfect or stabilize the solid particles into a substantially water-free sludge.

In the waste water treatment process disclosed in the foregoing U.S. Pat. Nos. 3,943,955 and 3,953,331, the waste material, which is soupy in texture, is thoroughly mixed with chlorine gas in a primary reactor tank or chamber. The reaction in the chamber, which takes place at a predetermined pressure, oxidizes the organic materials. The treated solid particle-containing water material which flows from the chamber is divided into two parts. One part (e.g. 75-85%) is returned to the primary reactor along with fresh, untreated waste material for re-treatment while the remaining part (e.g. 15-25%) is treated in a secondary reactor. The treatment in the secondary reactor involves swirling the waste material within a tank or chamber to continue the reaction under pressure. The pressure in the secondary reactor is about the same or a slightly lower than that found in the primary reactor. The treated material flowing from the secondary reactor is then removed and dewatered.

The dewatering of the treated waste material typically involves pouring the material into a lagoon or pond and allowing the solid particles to settle to the bottom. Then the water, which is above the sludge formed by the coalesced particles, is removed by pumping, evaporation or the like conventional water removal techniques. This dewatering system requires a substantial lagoon area and a considerable amount of time. For example, it may take thirty to sixty days to complete the settlement of the particles, at which time the water may be removed. In a typical municipal type of treatment plant, where waste water material is continuously processed, the lagoon facilities must be extensive to handle the quantity of waste water treated.

Prior chemical oxidation waste water treatment facilities have operated on a continuous basis, that is, continuously receiving waste water and continuously treating the waste water until the water is deposited in the available lagoon for settlement. Since chemical oxidation is adapted to handle large quantities of waste water within relatively short periods of time per gallon of waste water, such systems potentially have considerable advantage over other waste water treatment systems which utilize aerobic, anaerobic or both types of treatments. However, the chemical oxidation treatment, such as that described in the above-mentioned patents to Bradley, U.S. Pat. Nos. 3,943,955 and 3,953,331, may produce noxious odors during operation which, at times, are intolerable to the surrounding area and require shutdown of the facilities until dissipation. In addition, although the chemical oxidation system equipment can be relatively compact, because of the extensive settling lagoons that are required for dewatering, a considerable amount of area is needed for such a treatment facility.

Thus, the present invention is concerned with two major areas of improvements over the prior chemical oxidation process. One improvement area concerns the elimination of the noxious odor problem while simultaneously producing a sludge which is consistently and uniformly more stabilized or disinfected than the sludge of the prior process. The second area of improvement is concerned with rapidly dewatering, that is, separating the sludge from the water, so as to eliminate the need for extensive lagoons or any other types of dewatering systems that are presently used for dewatering waste sludges.

SUMMARY OF INVENTION

In the process of this invention, waste water material comprising particles of organic solids suspended in water is treated by mixing the material thoroughly with chlorine gas to produce oxidizing reactions which stabilize or disinfect the otherwise putrescible, unstable solid waste particles. This is accomplished by flowing the waste water material through a reaction chamber into which chlorine gas is also flowed for mixing and reacting with the waste material. The treated, soupy waste material is then withdrawn from the reactor chamber for dewatering.

However, before chemically oxidizing the waste water material, the material to be treated is assembled into a discrete batch. That is, the treatment is of a batch rather than of a continuous flow of waste water. Once the batch is collected in a suitable container, it is pre-treated to bring its pH to a level which is close to acid-alkaline neutrality, that is, in the range of between about 6.5-7.5 pH or more preferably in the range of between about 6.8-7.0. Normally, waste water material is at a lower pH, and therefore, the addition of sodium hydroxide, lime or the like raises the pH to the desired level. Conversely, if the waste material is too alkaline, the pH may be lowered by adding clear water filtrate at a lower pH, as will be later described. Thus, the initial treatment of the waste water involves forming a batch, rather than a continuous flow, and then adjusting the pH as indicated.

The use of a batch of waste material permits obtaining a substantially uniform pH throughout the entire batch. It has been discovered that the utilization of the substantially uniform pH in the indicated range results in more complete oxidation of the waste solid particles. This pH level completely eliminates the noxious odors that otherwise appear from time to time in this kind of process and simultaneously results in a much higher degree of disinfection or stabilization of the resulting sludge.

This invention further contemplates flowing the treated waste water material into a suitable receptacle and allowing the solid particles to float to the surface of the water, rather than settle to the bottom of the receptacle. The flotation is accomplished by utilizing the minute bubbles of gas which are formed in the reaction chamber and which adhere to the particles. These bubbles, therefore, buoy the particles for floating on the water. By immediately placing the treated soupy liquid in the separation receptacle, the particles coalesce into a sludge layer floating upon the water. At that point, the water may be gravity or pump-assisted drained from beneath the solid material. This drainage is accomplished rapidly. Thus, the sludge settles to the bottom of the receptacle after the water is drained.

The flotation of the solid particles may be assisted or expedited by the utilization of conventional polymer flocculents which tend to flocculate the fine particles so that they more rapidly coalesce and float as a sludge upon the water. Significantly, instead of waiting until the particles settle to the bottom as a sludge sediment and then pumping the water out of the receptacle from above the sludge, this invention contemplates floating the particles upon the water and then rapidly draining the water out from beneath the sludge that is formed by the particles. The water may be drained from beneath the sludge, depending upon the size of the receptacle, in a manner of minutes through a matter of hours. This is a dramatic difference between the amount of time, e.g., 30-60 days, required in the prior process where the sludge settles to the bottom of the water.

An object of this invention is to process the waste water in separate batches, with each batch having its pH adjusted to a substantially uniform, relatively higher pH than that used with the prior chlorine oxidation treatment systems. This produces an odor-free operation, that is, an operation which may mildly smell of chlorine or may smell medicinally, but which does not produce noxious odors which are intolerable to the local area. In addition, this pH adjustment pretreatment of the raw material results in the formation of greater amounts of the more effective oxidants which are produced by chlorine reactions with organic materials, particularly hypochlorous acid. This stabilizes the waste solids to a higher degree than previously obtained.

Another object of this invention is to provide a method which results in treated sludge which is sufficiently disinfected so that it may be used as fertilizer or as ground cover. That is, an object of this method is to provide a sludge treatment result which is equivalent to what is called a "process to further reduce pathogens" (referred to as PFRP) in which substantially all of the bacteria and pathogens within the material are destroyed so that the material may be immediately used as fertilizer, ground cover, or the like. Thus, this system results in a sludge which is disinfected or stabilized more than sludge from "processes to significantly reduce pathogens" (referred to as PSRP). PSRP sludges may not be directly used without additional treatment. Typically, they must be disposed of through landfill dumping PFRP sludges may be directly used without further treatment.

Still a further object of this invention is to provide a method in which treated waste water, which contains oxidized solids suspended in water, may be rapidly dewatered by floating the particles to the surface of the water and then draining the water from beneath the particles, such as by gravity draining. Thus, extensive lagoons or other more complicated, mechanical dewatering equipment are eliminated. Meanwhile, the water, which may be slightly chlorinated, is clear and clean enough to be passed into a normal municipal water treatment plant. In such case, where the water is slightly chlorinated, it is usually welcomed because ordinarily chlorine is added to municipal water treatment plants. Therefore, the chlorine carried by this water or filtrate reduces the amount of chlorine otherwise required by a water treatment plant.

Summarizing, the invention herein relates to a process for stabilizing and dewatering contaminated sludges to produce a sludge cake which is freely usable as a fertilizer or a ground cover in which the pathogens are destroyed, while the resultant water is of sufficient clarity that it may be reused with little or no additional processing. The equipment needed to perform this process is of small size. Thus, the equipment may be made portable for handling relatively small quantities of waste material, such as in processing the sewage or septage waste waters of a small community or of a factory. The necessary equipment is relatively inexpensive and of simple construction. Therefore, depending upon needed capacity, the equipment lends itself to either permanent or portable operation. Because of the batch type of operation, the process may be operated sporadically, that is, whenever a sufficient-size batch has accumulated. Consequently, servicing and maintenance of the equipment can be performed between batches, i.e., without disrupting or shutting down the disposal system of a community. Since noxious odors and volatile organics, i.e. toxic wastes, are not produced in this process, the location of the equipment and the times of operation of the process are not restricted, and additional equipment or processes for handling such odors or volatile wastes are not needed.

These and other objects and advantages of this invention will become apparent upon reading the following description, of which the attached drawings form a part.

DESCRIPTION OF DRAWINGS

FIG. 1 diagrammatically illustrates a system for the sludge treatment of this invention.

FIG. 2 diagrammatically illustrates a sludge treatment system which is portable.

DETAILED DESCRIPTION

FIG. 1 diagrammatically illustrates a system incorporating the method of this invention. The equipment includes a sump 10 or receiving tank into which waste water material is dumped. For example, septage waste may be brought to the site of the equipment in collection trucks which dump the waste into the sump. Alternatively, the sump may receive waste material from other sources, such as a municipal treatment system, a waste discharge system from an industrial plant or food processing installation, etc. The waste material flows from the sump 10 through a conduit 11 into a maserator 12 which grinds the solids into a fine particulate size. A suitable pump may be incorporated in the sump or adjacent the sump for pumping the material to the mascerator, and appropriate filters may be utilized to filter out large objects such as metal pieces and the like which are not treated in the system. The mascerator includes a discharge outlet 13 which schematically illustrates the removal of objects that are not to be incorporated in the waste material that is treated.

From the mascerator, the waste water materials containing the ground, fine particles, which preferably are no larger than one-quarter inch in size, travel through a conduit 14 to a holding tank or container 15 within which a batch of material to be treated is collected. The size of the batch tank may vary considerably, depending upon the equipment and the amount of waste material to be processed therein. A mechanism 16, connected to the container 15 by means of a suitable conduit 17, is used to adjust the pH of the material that makes up a single batch. For example, the mechanism may include a tank of sodium hydroxide and a suitable pump for pumping the sodium hydroxide into the tank 15 for raising the pH where the raw material has a pH below that desired. Suitable commercially available containers and pumps may be used in adjusting the pH. In addition, a suitable mechanical mixer 18, which is schematically illustrated, is arranged within the tank 15 for mixing the material within the tank.

The holding tank or container 15 also includes a valved drain or outlet 19 from which samples may be taken for testing the pH of the raw material forming the batch. Thus, a flask 20 is schematically shown to indicate the sampling of the batch.

A pipe 21 carries the raw material from the container 15 to a positive displacement pressure pump 23 which, in turn, pumps the raw material through a pipe 24. An eductor 25 is installed on the pipe 24. The eductor 25 is similar to a venturi tube having a narrowed throat for sucking gas from an outside supply source into the pipe 24. Chlorine gas in a pressurized tank 26 is supplied to the eductor through a conventional pressure regulator on the tank. The chlorine gas enters the pipe 24, through the eductor, for mixing with the raw waste material flowing through the pipe and through an entrance portion 27 into a main reactor tank or chamber 30.

Preferably, the pipe entrance 27 is arranged tangentially relative to curved surface of the cylindrically-shaped, horizontally-arranged reactor chamber so that the material flowing into the chamber tends to swirl around the interior curved surface. This swirl flow, which is schematically shown in dotted lines and is designated 31, causes thorough mixing of the waste material with the chlorine and with the products of the chemical reactions resulting from the introduction of the chlorine into the raw material.

The swirling mixture flows out of the reactor tank or chamber 30 through a tangentially-arranged outlet pipe 32 to a pipe junction 33. At this junction, the bulk of the treated material flows through a return pipe 34, as indicated by the arrows, back to the pump 23 for recycling. Meanwhile, a minor part of the treated material flows through the pipe 35 into a secondary reactor 37. In the secondary reactor, the material swirls about (as indicated by the dotted lines 38) for continuing the chemical reactions as the material rises in the tank. The tank is illustrated as being vertically arranged so that any particles, such as sand or other inert materials, which would not otherwise be suspended in the water, are carried upwardly by the soupy or watery waste material.

Although the amount of material diverted back to the primary or main reactor may vary, it is contemplated that a considerable portion of the material will be recycled. For example, 75-85% of the waste material will be recycled back to the pump 23, through the eductor 25 and back to the reactor 30. Meanwhile, a minor portion of the material, such as on the order of approximately 15-25%, is passed through the secondary reactor 37 for continuing the chemical reactions, but without adding more chlorine gas and without adding more raw waste material.

The treated material from the secondary reactor flows from a discharge pipe 39 through a positive pressure pump 40. This pump is used as if it were a valve. That is, an ordinary throttle valve would tend to plug due to the fine particles passing through it. Thus, by utilizing a pump, which may be reversely-operated, a back pressure is produced which resists, but does not overcome, the discharge flow from the secondary reactor. That is, the pressure of the flow exceeds the pressure of the pump. The pump pressure may be adjusted, so that the pressure in the secondary reactor is maintained at a point which is just below the pressure of the main reactor. By way of example, the main reactor may be operated at a pressure of between about 30-45 PSIG or preferably in the rough range of 35 PSIG. The secondary reactor will have a pressure slightly below that amount to enable the flow of material from the primary reactor. The pressure in the system is maintained by the reverse action or back-pressure of the pump 40.

The soupy-looking, treated material from the secondary reactor travels through a pump outlet pipe 45. A suitable drain, with an open-close drain valve 46, is provided in the line for taking samples. The sampling is schematically illustrated by a flask 47 which may receive samples for testing.

An on-off valve 48 in the pipe 45 permits diversion, when desired, of the treated material back to the batch tank or container 15 through a return line 49. This may be used for simply recirculating all the material flowing through the system without removing any treated material. This recirculation of the material through the entire system may occur for a short time while the raw material in the batch is being adjusted to the desired pH level.

The pump discharge pipe 45 continues through an ejector fitting or joint 50, which is a commercially available device that permits liquid from an external venturi 51 to flow into pipe 45. The venturi sucks a flocculent material into the liquid flowing through the outlet pipe 45. Here, a commercially available polymer flocculent, within a container 52, is drawn through the venturi and into the ejector by pressurized water. Preferably, filtrate that is separated from the treated material provides the pressurized water. For example, filtrate flowing through a pipe 53, at a pressure of roughly 60 psig, may be added through the venturi. As an example, this may insert about 5% additional water into the flow of oxidized, treated waste material. The flocculent tends to coalesce or flocculate the fine particles of the solids which expedites flotation.

The treated material flows from the ejector 50 through a discharge pipe 54 into a dewatering receptacle or tank 55. Preferably, the receptacle includes a bed or floor covering of sand 56. The solid particles, whether flocculated or fine, are buoyed to the surface to form a layer of sludge 58 which floats upon clear water 59. The clear water rapidly drains, by gravity, through the sand bed 56 and out through a discharge drain 57.

Typically, the clear water is clean, but acidic, as for example, in a pH range of roughly 3.5. Therefore, before discharging water for reuse, lime or sodium hydroxide contained within a storage vessel 60 is pumped through a pipe 61 into the discharge pipe 57 to raise the pH to an acceptable level, such as roughly around 6.5 or closer to neutral 7.

The water emerging from the discharge pipe 57 may flow to a sewer or to a conduit 62 which may carry the water to a municipal water treatment plant. The water may be left slightly chlorinated so that is provides some chlorine for use in the municipal plant water processing.

Where the raw material batch in the holding tank or container 15 is too alkaline, some of the acidic water from the discharge pipe 57 may be diverted through an on-off valve 63 to a pipe 65 that returns to the adjustment mechanism inlet pipe 17 on the batch container 15. Thus, the slightly acidic, clear water may be used to reduce the pH of the batch where appropriate. The pipe 53 may also be connected to pipe 65 through a suitable valve 66. A pump, not shown, may be used to pressurize the flow through pipe 53.

In operation, by way of example, the batch tank 15 may hold on the order of 85–86,000 gallons of raw waste water material. The raw waste water material may be fed through the pump 23 and the oxidation system at a rate of about 11 to 12,000 gallons per hour up to about 20,000 gallons per hour.

A test sample of the raw material in the batch may be taken, through the batch container drain 18, in test flask 19. The pH is determined using a conventional meter for that purpose. Since the batch may consist of material from a number of different sources, as for example, septage from a number of septic tanks combined with a number of industrial waste sources, the raw material typically has a low pH. As septage ages, it becomes sour, creating volatile acids and alcohols, so that its pH is low. For example, the pH could be on the order of about 3–4. Using that pH as a rough example, the pH adjustment mechanism 16 is operated to pouring a sufficient amount of sodium hydroxide or the like alkaline material into the batch to raise the pH to the desired level. The pH in the batch may be in the range of between about 6.5–7.5, but preferably is in the range of between about 6.8–7.

The reaction between the chlorine gas and the waste water materials produces hydrochloric acid and hypochlorous acid. In the desired range of pH, more hypochlorous acid is formed by the gaseous chlorine than hydrochloric acid. Hydrochloric acid (HCl) will not oxidize the solid organic particles, although it will do some disinfecting. However, the hypochlorous acid (HOCl) as well as the hypochlorite ion, which is also formed by and with the HOCl, are powerful oxidizers in this system. Therefore, an object is to provide a sufficient quantity of these oxidants, particularly the hypochlorous acid, which is the most powerful oxidizer in the system.

When the batch is in the above-mentioned desired pH range, sufficient hypochlorous acid is formed to effectively disinfect the solid materials, that is, to destroy the pathogens (i.e., the bacteria and viruses, etc.) and to eliminate further bacterial growth. The result is a treated solid waste material which is about 99.9% disinfected. This completely eliminates the offensive odors that are otherwise produced by this type of equipment. In addition, this produces a sludge which is sufficiently disinfected or stabilized that it may be used as fertilizer material or may be applied as ground cover in farming land. Thus, disposal of this sludge material is relatively easy as compared with less stabilized material which cannot be readily used for farm purposes and must be placed in controlled waste disposal dump sites or must be further treated.

In order to make the batch substantially uniform with respect to its pH, the entire batch may be re-circulated through the system by returning the flow from the reactors through the return line 49 to the batch tank or container 15. This recirculation, and additional mixing in the tank, may take place for a few minutes. Once the batch is at the required pH, the material is flowed as follows: through the pump 23, the pump pipe 24, the eductor 25 where the chlorine gas is introduced, and then into the outlet pipe 27 that delivers the material to the main reactor 30 where it is swirled 31 throughout the reactor chamber. After the thorough mixing and the chemical reactions in the reactor, the material flows out of the pipe 32 where, as mentioned above, a major portion of the treated material is recirculated back to the primary reactor 30 through the juncture 33 and return pipe 34 to the pump 23. A minor portion of the treated material from the primary reactor travels through the pipe 35, where it is swirled 38 through the secondary reactor 37 and the outlet 39 to the valve-like pump 40. Then the material, without being otherwise pH adjusted, is flowed through the discharge pipe 45 and discharged through the discharge pipe 53 into the dewatering tank or receptacle 55 where the particles float to the surface of the filtrate water 59. The water 59 drains downwardly through the filtering sand bed 56 and is either discharged into the sewer system for treatment at a municipal water plant or into some other suitable discharge. Alternatively, when desired, some of the water may be recirculated back through the diversion valve 63 and the return pipe 65 to the batch tank or container for use in adjusting the batch pH.

Sometimes, certain waste material or sludges are difficult to process. In those cases, filtrate may be added to the batch tank, through return pipe 65, to lower the pH. Then, the pH may be adjusted, i.e. raised, by adding sodium hydroxide. This assists in processing the material through to the final dewatering.

While the amount of chlorine inserted may vary depending upon the nature of the material being treated, the flow rate, etc., by way of example, the chlorine dosage rate may run from 700–3000 mg/l with a material flow of between about 11,000–20,000 gallons per hour.

The dewatering or separation receptacle 55 may be shaped like a swimming pool. For example, such a receptacle may be roughly 30 feet by 100 feet in length. Preferably, a pair of these are used, side-by-side, so that alternate receptacles can be used as needed for receiving the treated discharged waste. The size of the dewatering receptacle may vary considerably. Also, the sand bed may be eliminated since the water draining from beneath the sludge covering may be pure enough for many purposes so that it may be discharged without the sand filtering.

Significantly, the operator of the system may use the sample of the treated material taken from the sample nozzle 46 at the valve-pump discharge pipe 45 as a visual indicator for adjusting the pH of the raw waste water material. As schematically illustrated, a sample of the treated material is obtained in a flask 47. That sample is measured to determine its pH which may run in the range of between about 2.8–4.2. That is, the pH of the treated discharge material end is roughly about three points lower than the pH of the raw material batch.

In addition, the operator may visually observe the separation of the solids from the liquid, that is, the flotation of the solid particles upon the liquid. That separation should begin immediately upon filling the flask with the sample. Within a few minutes, separation should be complete with the solid particles material floating on top of clear water. With trial and error experience, the operator can determine whether the pH of the raw material in the batch container is near optimum for that particular batch. That is, the amount of time taken for complete separation, as well as the fact of complete separation, will indicate, to an experienced operator, that the pH of the batch raw material is at about optimum for that particular batch.

Typically, the complete separation in the separating receptacle 55 may be accomplished in a matter of ten minutes through one-half hour, although in some cases it may take a little longer depending upon the size of the batch, etc. However, the maximum time of flotation separation is a matter of merely hours, as compared to ordinary lagoon-type of settlement separation, which takes many days (e.g., thirty to ninety days), and as compared with mechanical filter types of separators that are sometimes used in waste treatment plants. Such mechanical filters take a greater period of time to handle an equivalent amount of material and, significantly, utilize expensive and relatively complicated presses, filter devices and other equipment.

A typical waste water batch may have solid particles which make up about 1-5% percent by volume of the soupy material, with the balance being water. The batch may include some heavy metals. In this process, heavy metals and the like remain with the solids rather than with the water. Thus, the purity of the water is not affected by the heavy metals that may enter the system.

In order to expedite the separation of the solid particles from the liquid, a conventional flocculent polymer may be utilized. An example of such a flocculent is a polymer manufactured by Allied Collodis, Inc. and identified as Percol 757, which may be fed into the treated material at a rate of about six pounds of polymer mixed into 200 gallons of water to form a solution which is injected with filtrate and mixed with about 30,000 gallons of oxidized sludge.

The flotation of the particles is initially caused by the minute bubbles of gas which are formed in the reactors and which adhere to the fine particles. It is believed that these bubbles of gas essentially comprise nascent oxygen and, in addition, nitrogen and carbon dioxide gases which are formed during the reactions of the oxidants with the carbonaceous materials and the nitrogen-bearing materials that make up the organic solid particles. Whether the bubbles comprise more or less of these three gases or other specific gases, it appears that fine bubbles of some gas adhere to and buoy the particles, like "water wings," to assist in flotation. Consequently, it is important to discharge the treated waste material into the separation receptacle immediately after treatment, before any additional changes are made to the ph of the treated material. This contrasts with prior processes in which the pH of the treated material is immediately adjusted to raise the pH towards neutral before the material is placed into the settling lagoons. In the case of this invention, the pH is not adjusted and remains as it comes from the discharge of the treatment. After the water is drained from beneath the sludge, the water may be treated to adjust its pH to a level that is acceptable for discharge.

It has been found that the sludge cake produced from waste material which is treated by the present process, which may be directly utilized as a fertilizer for farm land, plant nurseries or the like. Alternatively, the sludge cake may be applied, without further treatment, directly upon land because the sludge is not harmful or toxic. Hence, disposal of the sludge is relatively simple as it may be either sold or given away and does not require special, controlled dump sites.

PORTABLE SYSTEM

The method of this invention essentially requires only a small amount of inexpensive, simple equipment. That is, a holding tank of sufficient size to accumulate a predetermined-size batch of material is needed. In addition, the equipment includes one or more reactors, which may be very small depending upon the desired capacity and speed of operation. Further, the system requires a separation receptacle. Because the flotation separation and the draining of the water from beneath the floating sludge is so rapid, a very small receptacle may be used, depending upon the amount of gallonage treated at one time. Hence, the system may be made portable.

FIG. 2 schematically illustrates a portable system where a holding tank 70 is located at a fixed site. The holding tank may be in a small community, a manufacturing plant, food processing tank or may even be a sump in which septage is collected from septic tank cleaner trucks. The tank may be filled through an inlet pipe 71. Its pH may be determined by taking samples, through a valved discharge nozzle 72, in a test breaker or flask 73. The pH may be adjusted by a suitable mechanism 74 which may be a container of sodium hydroxide, lime or the like that may be injected into the holding tank 70 in sufficient quantity to bring the pH to the required level. The tank also includes a suitable mechanical mixer 75 (schematically shown).

The raw, untreated material may be pumped out of the holding tank, through a pipe 76 by a positive displacement pump 77. The pump has a discharge pipe 78 that carries the waste material to the reactor 80. An eductor 81 is located in the pipe 78. Chlorine gas from a portable chlorine gas tank 82 is injected into the pipe 78.

The mixture of chlorine gas with the raw, untreated waste material flows into the reactor 80 through a suitable nozzle or inlet 83. Preferably, the nozzle opens into the reactor tangentially to the curved surface of the cylindrically-shaped reactor. This swirls and rapidly mixes the material and the gas within the reactor, as schematically shown by the dotted swirl lines 84.

After thorough mixing and after the chemical reactions are completed to the point where the raw material is oxidized to the desired purity, the treated material may be pumped out of a reactor discharge line 85 through a pump 86 which operates in such a way as to maintain the desired pressure within the reactor. For example, the reactor may operate at 35-45 PSIG. The treated material travels through a discharge pipe 87 into a portable separation receptacle 88 where the solids particles float to the surface and form a sludge 89. A polymer flocculent injection system, similar to that described above in connection with the stationary system, may be carried upon the truck and operated in the same manner to flocculate the fine solid particles. The water 90, which is located below the sludge, may be drained from the receptacle through a suitable hose 91. Then, the sludge may be carted away. A return pipe 92 connects the reactor discharge line 85 to the pump 77 for recycling the waste material through the reactor when desired.

The equipment, including the reactor, the separation receptacle, the chlorine gas tank, and the eductors and pumps, may all be mounted upon one or two trucks 95 so that they may be moved from site to site as desired. For example, a portable, single or two-truck unit carrying the separation tank and the reactor, may be moved to a site where a fixed tank of raw sewage is located.

A tank which may have a capacity of roughly 80,000 gallons is relatively large for a small community or industrial installation and may take a number of days to fill. That amount may be run through the portable reactor at a rate, for example, of 10,000 gallons per hour so that in a matter of a day, the batch collected in the holding tank is completely processed. The water collected in the separation receptacle may be drained into an available municipal water system or upon open land. The sludge may remain in the receptacle for carting away in the receptacle truck to a dump site where it may be dumped or spread over the land without further treatment. If the processing speed is increased, only a small number of hours may be needed to clear a particular-size batch. Periodically, the portable equipment may come to the collection site, clear the holding tank, dispose of the sludge and then return a number of days later when needed.

Because the process does not produce noxious odors and the sludge and water are clean and are usable without special handling, the system lends itself to portability. This can significantly reduce the cost to a small community, industrial facility or the like.

Having fully described an operative embodiment of this invention, we now claim:

1. A method for chlorine oxidation treatment of waste water material containing organic solid particles for disinfecting and separating the solid particles and the water, comprising essentially the steps of:
    (a) preparing a batch of waste water material in a container;
    (b) adjusting the pH of the batch of the material to close to the range of acid-alkaline neutrality;
    (c) flowing the batch of material into and through a reactor chamber;
    (d) mixing chlorine gas into the batch material in the chamber to chemically form in situ hypochlorous acid and to produce hypochlorite ions and nascent oxygen for oxidizing the organic material in the batch until it is substantially disinfected;
    (e) flowing the treated batch material into a separation receptacle, without changing the pH of the treated material;
    (f) floating the solid particles to the top of the water buoyed by bubbles of gas formed during the mixing of the material in the chamber to separate the solid particles above the water;
    (g) draining the water from beneath the solid particles, thereby leaving a relatively dry, stabilized, disinfected solid sludge in the receptacle and clear water drained from the receptacle.

2. A method as defined in claim 1, and including adjusting the pH of the batch of material in the container to between about 6.8–7.0.

3. A method as defined in claim 1, and including adjusting the pH of the clear water drained from the receptacle, after it is removed from the receptacle, to roughly near neutral for recycling the water for reuse as clean water.

4. A method as defined in claim 1, and including controlling the pH level of the batch of material in the container and the length of time for mixing the material in the reactor chamber by sampling the material during the mixing and visually observing the rapidity of the solid particles rising to the surface of the water and thereby separating the solid material from the water and leaving clear water beneath the solid particles, and adjusting said pH level in response to the visual observation.

5. A method as defined in claim 4, and including continuously recycling treated batch material flowing from the reactor back to the container until visually observing the rate of separation of at least one sample of treated material taken from the reactor chamber.

6. A method as defined in claim 1, and including adding a polymer flocculent-promoting material to the treated material draining from the reactor chamber to the receptacle for flocculating the solid particles for increasing the rate of flotation of the particles to the water surface.

7. A method as defined in claim 1, and including continuously recirculating a substantial portion of the treated batch material draining from the chamber to the separator receptacle back into the chamber for additional mixing before draining that portion of the material into the separation receptacle, while draining the remaining portion of the treated, draining material directly into the separation receptacle.

8. A method as defined in claim 7, and including initially flowing mixed batch material back to the container for continuously recycling the mixed material through the container and chamber for a short start-up period of time for obtaining better uniformity of the pH of the waste water material.

9. In a method for oxidation treatment of waste water material containing organic solid particles in water for stabilizing and dewatering the particles into a relatively dry, disinfected, stabilized sludge wherein chlorine is mixed with the material for chemically forming oxidants which treat the material during the mixing for disinfecting the solid particles, and wherein the treated material is dewatered after treatment by the oxidants to produce a solid sludge residue, the improvement comprising:
    (a) forming the raw, untreated material into a discrete batch;
    (b) adjusting the pH of the batch to between about 6.6–7.5 before treating the material;
    (c) flowing the treated material immediately after said oxidant treatment into a separation receptacle;
    (d) permitting the solid particles to float to the surface of the water until the water is substantially clarified;
    (e) draining the water from beneath the floating particles, so that the particles form a substantially dry, stabilized sludge and the drained, clear water may be separately reused.

10. In a method as defined in claim 9, and including adjusting the pH of the batch to between about 6.8 and 7.0.

11. In a method as defined in claim 9, and including forming minute gas bubbles during the mixing, which bubbles attach to and buoy the particles to enhance flotation of the particles, and including flowing the treated material into the separation receptacle and causing the separation to occur while the bubbles are present and produce the buoying effect.

12. In a method as defined in claim 11, and including adding a polymer flocculent to the treated material while the material is flowed to the separation receptacle for flocculating the particles and thereby expediting their flotation and separation from the water.

13. In a method as defined in claim 9, and including raising the pH of the separated water, after the separation of the water, sufficiently for flowing the water into a water system wherein it may be reused.

14. A method for treating waste water containing solid, organic particles mixed in water for separating the particles into a sludge, comprising essentially the steps of:
   (a) mixing the waste water with a gas-generating oxidant for sufficient time to chemically disinfect the organic particles by oxidation and to generate minute gas bubbles which tend to adhere to the particles;
   (b) immediately flowing the treated waste water into a separating receptacle;
   (c) permitting the gas bubble buoyed particles to float upwardly upon the water;
   (d) draining the water from beneath the particles, leaving a relatively dry, coalesced sludge residue, with the water being relatively clear, and removing the water to a location for its reuse.

15. In a method as defined in claim 14, and including raising the pH of the separated water, following the separation step, sufficiently for flowing the water into a water system wherein it may be reused.

16. In a method as defined in claim 14, and including forming a floor comprising a thick layer sand-like material in the receptacle and gravity-draining the water from beneath the floating particles through the floor for filtering the water as it is removed from the receptacle.

17. A method for oxidation treatment of waste water material containing organic solid particles in water for disinfecting, stabilizing and dewatering the material, including the steps of:
   (a) collecting waste water material in a container to form a batch at a fixed collection site;
   (b) providing a portable reactor chamber and bringing the chamber to the batch collection site;
   (c) determining the pH of the batch of material and adjusting the pH into approximately the range of between about 6.8 and 7.2;
   (d) flowing the pH-adjusted material into the reactor chamber and mixing the material with chlorine gas in the chamber to produce oxidants and oxidizing the material in the reactor chamber while simultaneously producing minute gas bubbles which tend to adhere to the particles;
   (e) providing a portable receptacle and flowing the treated material from the reaction chamber into the receptacle;
   (f) permitting the gas bubble buoyed particles to float to the surface of the water for separating the particles into a sludge floating upon clear water;
   (g) draining the clear water from the receptacle and removing the disinfected, stabilized sludge for disposal thereof.

18. A method as defined in claim 17, and including preparing a number of collection containers at different sites and moving the reactor chamber and separation receptacle from site to site for treating the batch of material at each site separately.

* * * * *